United States Patent [19]

Dickerson

[11] Patent Number: 4,611,425

[45] Date of Patent: Sep. 16, 1986

[54] BOLL WEEVIL TRAP

[75] Inventor: Willard A. Dickerson, Raleigh, N.C.

[73] Assignee: The United States of America as represented by the Secretary of Agriculture, Washington, D.C.

[21] Appl. No.: 734,647

[22] Filed: May 16, 1985

[51] Int. Cl.⁴ ............................................. A01M 1/10
[52] U.S. Cl. ........................................ 43/121; 43/122
[58] Field of Search ........................... 43/122, 121, 107

[56] References Cited

U.S. PATENT DOCUMENTS 1,093,599  4/1914  Beebe .................................... 43/122
1,386,408  8/1921  Karbouski ............................ 43/121
3,949,515  4/1976  Mitchell ............................... 43/121

FOREIGN PATENT DOCUMENTS 19292 of 1929 Australia ................................ 43/107

Primary Examiner—Gene P. Crosby
Attorney, Agent, or Firm—M. Howard Silverstein; David G. McConnell

[57] ABSTRACT

A boll weevil trap has a base member, an inverted wire mesh funnel on top of the base member, a capture chamber mounted over the apex of the funnel, further including a funnel jacket releasably mounted on the mouth of the funnel to retain the funnel in place and maintain the circular configuration of the funnel's mouth. Jacket retaining apparatus is releasably connected to the jacket and to the base member to hold the jacket in place on the base member.

20 Claims, 8 Drawing Figures

BOLL WEEVIL TRAP

FIELD OF INVENTION

This invention relates to a device for capturing boll weevils.

DESCRIPTION OF PRIOR ART

Pat. Nos. 3,949,515 and 3,987,577 define prior art devices for capturing boll weevils. An article by Dickerson et al in the Journal of Economic Entomology, June, 1981, pages 280-282 sets forth improvements in such devices. In general, these devices provide a base member or support, an inverted funnel on top of the support to define an annular space between the mouth of the funnel and the top of the support, and a capture or trapping chamber on top of the funnel so that the apex of the funnel substantially extends into the top of the chamber. In practice the boll weevils crawl through the annular space between the funnel and base member, and then upwardly along the inside wall of the funnel, afterwhich they leave the funnel through an opening at the apex thereof and enter the capture chamber. They are drawn to the chamber by a lure such as a sex pheromone inside the chamber. Insecticide may be placed in the chamber to kill the weevils.

SUMMARY OF INVENTION

I have now designed a trap which is substantially more efficient than the prior art and yet can be inexpensively fabricated and readily assembled and disassembled from a plurality of components. The basic components described above are employed in the present invention. In particular, a wire mesh funnel (patent '515) is employed as opposed to a solid funnel (patent '577) because it has been determined that the wire mesh funnel eliminates heat build up and provides for better pheromone dispersal.

In addition, instead of simply employing a wire mesh funnel by itself, a ring-shaped member is provided which is detachably mounted around the mouth of the funnel to maintain the circular configuration of the funnel's mouth.

A ring retaining means is releasably connected to the ring and also to the base member to hold the ring and funnel in place upon the base member.

The retention of the wire mesh by the ring, and the releasable attachment of the ring to the base member, provides for dimensional integrity of the annular space between the mouth of the funnel and the base member. As shown in the prior art, the width of this annular space is an important factor, and should be 3-5 mm. By maintaining the dimensional stability of this gap while employing a wire mesh funnel which otherwise is prone to vary in configuration during use and thereby alter this important dimension, the present invention provides substantially improved results over the prior art.

Thus an object of the present invention is to facilitate accurate spacing of important trap dimensions. Furthermore, the use of several readily detachable components enables the device to be cheaply manufactured, readily assembled, disassembled and stored. More particularly, the unit may be quickly hand assembled without special tools, damaged components may be readily replaced, and individual parts may be compactly stored. As a result, the invention provides a substantial savings in labor and storage requirements, and an increase in the useful life of the trap.

Other objects and advantages will be obvious from the detailed description of the invention made in reference to the accompanying drawings wherein:

FIG. 4 is a side view showing the engagement of clasping member 14 with ring 5a;

FIG. 4a is an alternative arrangement of the engagement of clasping member 14 with ring 5a;

DESCRIPTION OF PREFERRED EMBODIMENTS

Figure 1:
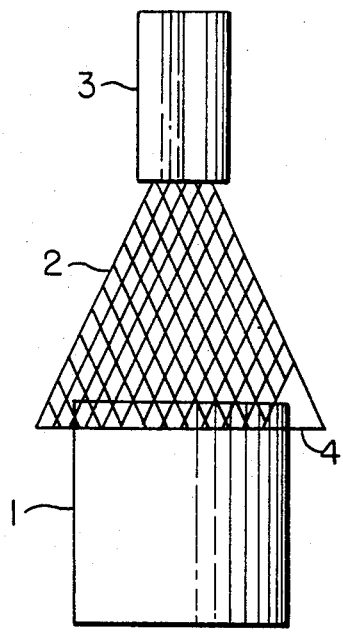
FIG. 1 is a side view of a prior art trap.

Referring to FIG. 1, which depicts a prior art device, the basic components employed in the present invention are the base or support member 1, the inverted, conically-shaped wire mesh funnel 2, and the capture or trapping chamber 3. Base member 1 may be impregnated with yellow pigment, as is known in the prior art, to provide attraction for the weevils in addition to the lure inside the capture chamber 3. The funnel and base member define an annular space 4 therebetween. In operation, the base member is mounted on a support pole (not shown).

Figure 2B:
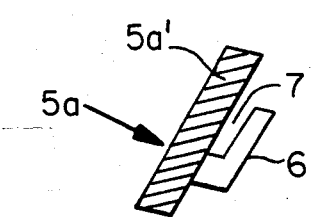
FIG. 2b is a cross-sectional view along line a—a of FIG. 2.
Figure 2:
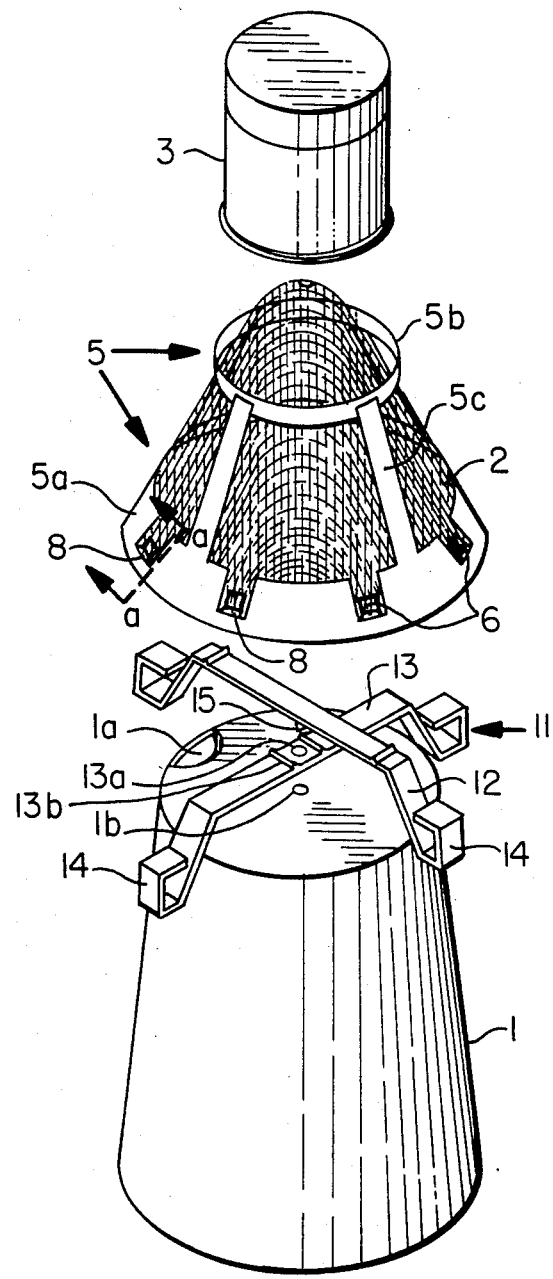
FIG. 2 is an exploded, perspective view of the present invention.

Referring to FIG. 2, in the present invention, in addition to the basic components of FIG. 1, there is provided a funnel jacket generally designated by reference numeral 5 which includes a first lower ring-shaped member 5a, a second upper ring-shaped member 5b, and a plurality of ribs 5c connecting the two rings.

Figure 2A:
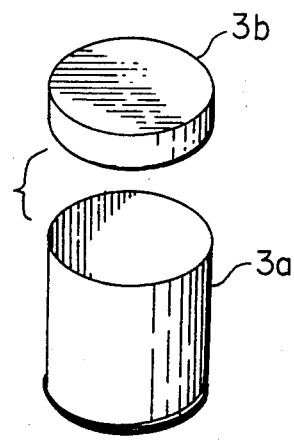
FIG. 2a is an alternative embodiment of chamber 3 of FIG. 2.

Capture chamber 3 snaps into second ring 5b or is otherwise releasably connected thereto, e.g., by a screw-on connection. As shown in FIG. 2a, the capture chamber preferably may be fabricated of two separable parts 3a and 3b to provide easier access.

The first ring 5a of jacket 5 is releasably connected to the mouth of funnel 2 generally by means of a plurality of spaced apart ledges 6 along the ring's inner periphery. FIG. 2b, which is a cross-sectional view of ring 5a along line a—a, shows that each ledge 6 and its adjacent ring surface define an upwardly facing notch or channel 7 on the inner periphery of the ring to thereby define a discontinuous, upwardly facing, inner circumferential channel means around the ring. As a modification, a continuous channel means formed from a continuous ledge may be employed around the inner periphery.

The wire mesh wall at the mouth of funnel 2 extends into and is received by the channel 7, and the outward force exerted by the mouth of the funnel against the outer periphery of the channel causes the funnel to be held in place by the channel, thus providing a constant circular configuration to the mouth of the funnel. If the funnel is fabricated by folding a flat piece of wire mesh into a funnel shape and thereafter stapling the adjacent edges, then the necessary force to hold the funnel in the channel 7 may be effected by providing a funnel mouth diameter slightly larger than the diameter of the circumferential channel defined in ring 5a. However, in those instances where the funnel is fabricated by distorting or molding a flat piece of mesh into the requisite shape, as opposed to folding it, then the funnel mouth dimension need not be as closely attuned to the diameter of the circumferential channel in ring 5a because the funnel mouth will exert a constant outward force in an effort to regain the original flat shape of the screen or mesh. In any event the ability of the circumferential channel in ring 5a to hold the funnel in place and provide a constant circular configuration to the funnel mouth enables the device to maintain the important dimensional integrity of the annular space 4 of FIG. 1.

Referring again to the components of funnel jacket 5, it will be seen that ribs 5c, which extend from ring 5a to 5b, conform to the slope of the outside of the funnel and thereby help maintain the funnel's conical configuration. Second ring 5b is positioned around the outside of the funnel at a location whereat the outside diameter of the funnel wall is approximately equal to the inner diameter of the second ring. The use of ribs 5c to connect the two rings provides sufficient overall openings in the jacket 5 to expose the funnel to the environment to thereby prevent heat build up and enhance pheromone dispersal. Other skeletal ring-connecting structures may be employed in place of the ribs as long as sufficient openings are provided for the funnel. Alternatively, the ring-connecting structure may be a unitary piece provided with a sufficient number of apertures.

In addition to the previously described function of ring 5b, it also functions to oppose upward movement of the funnel out of the circumferential channel in ring 5a. That is, if the funnel attempts to move upward, the wider diameter of the funnel toward the funnel's base will be unable to pass through ring 5b.

It also will be appreciated that slope-conforming ribs 5c inherently provide opposition to upward funnel movement. Further similar opposition to such movement is provided by the inwardly sloping upper segment 5a' of ring 5a (see FIG. 2b) which segment conforms to the slope of the outside of the funnel wall.

In some instances it may be possible to eliminate ribs 5c and second ring 5b, or to employ a ring 5a without an inwardly sloping upper segment 5a'. For example, depending upon materials of construction, the funnel wall may be able to retain its shape without the shape-conforming effect of ribs 5c; and the wire mesh may be sufficiently snug in the circumferential channel of first ring 5a that the further retention provided by the other components is unnecessary, or the weight of the capture chamber 3 sitting atop the funnel is all that is necessary to provide such further retention.

Referring again to ring 5a, it further includes a plurality of slots 8 which extend from the outer periphery of ring 5a through the body of the ring to its inner periphery. Each ledge 6 on ring 5a extends from an area on the ring body adjacent the lower border of each slot. In the preferred design, at least four slots 8 are provided along the circumference of the ring at 90 degree intervals.

Figure 3:
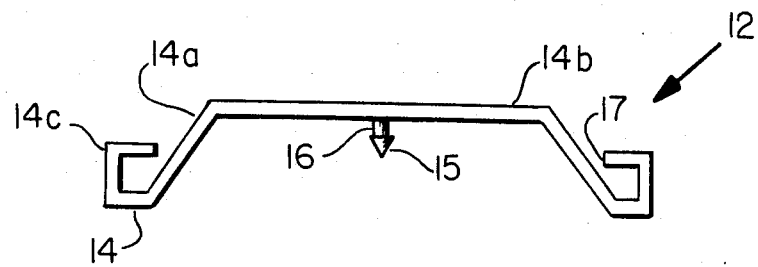
FIG. 3 is a side view of strip 12 of FIG. 2.

The jacket retaining means of the present invention generally is designated by reference numeral 11 in FIG. 2. This means comprises one or more generally flat, elongated strips or bars 12 and 13. Each strip includes a ring holding or clasping member 14 at both ends. As shown in FIGS. 2 and 3, a barb 15 at the end of a stem 16 on the underside of the uppermost strip 12 extends through a hole 13a in the lowermost strip 13, and then through a hole 1b in the top of base member 1 to releasably connect the entire jacket retaining means to the base member 1. Hole 1b is appropriately smaller than the barb to provide for secure but releasable attachment to the base. Other well known connecting equivalents may be employed in place of the barb and stem. The two strips 12 and 13 are maintained at right angles to one another by means of ridges 13b on the lower strip.

More details of the ring holding or clasping member 14 are shown in FIG. 3. Referring thereto, it can be seen that this member is defined by (a) downwardly projecting segment 14a adjacent the central horizontal segment 14b, (b) a curled segment 14c beyond such downwardly projecting segment. It can be seen that the curled segment projects upwardly and then inwardly toward its adjacent downwardly extending segment. When connecting the jacket to the holder or clasping member 14, the body of ring 5a is squeezed through the space 17 formed between the lead segment of curled segment 14c and its adjacent downwardly extending segment 14a. The flexibility of the materials of construction employed to make these parts, e.g., plastic or thin metal, permits space 17 to be temporarily opened wide enough to allow ingress of the ring body.

Figure 4:
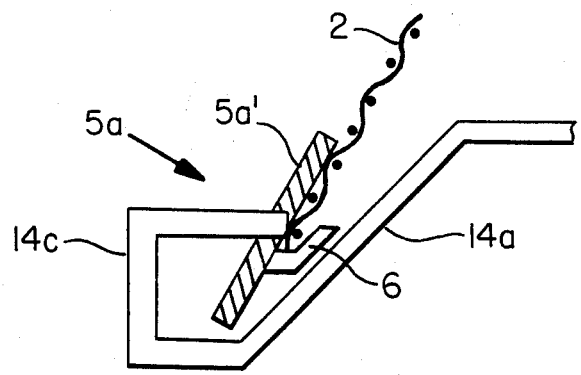

As shown in FIG. 4, when grasping or holding the ring 5a, the lead segment of curled segment 14c of either strip 12 or 13 extends from the outer periphery of ring 5a through a slot 8 to press against the wire mesh in channel 7 adjacent such slot. At the same time the downwardly projecting segment 14a presses against the inner periphery of the ring, including the outer surface of ledge 6. These two pressing actions provide the requisite force to retain the ring, and thereby the funnel, in place. In addition, the pressure exerted by the lead segment of curled segment 14c against the wire mesh further retains the wire mesh in place and thus further enables the device of the present invention to maintain the important dimensional stability of the annular space 4. In the preferred design there are more slots 8 in the ring 5a than clasping members 14 to facilitate securing the clasping member to the ring 5a.

Figure 4A:
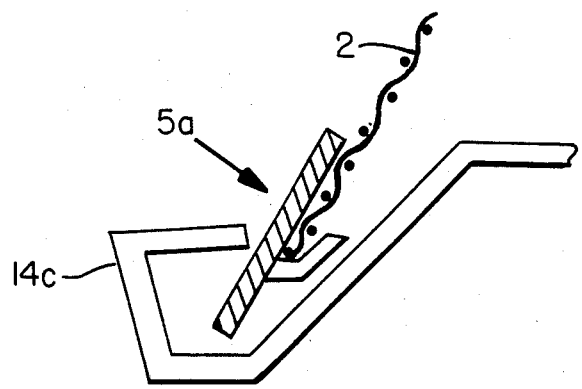

Referring to FIG. 4a, therein is shown an alternative arrangement of the clasping components of the present invention wherein the lead segment of curled segment 14c does not pass through a slot, but rather is positioned adjacent such slot and thus presses against the outer periphery of ring 5a rather than against the wire mesh. In this arrangement, the maintainance of the circular configuration of the funnel mouth is provided only by the forces holding the funnel mouth in channel 7. Accordingly, in some instances one might choose to fabricate ring 5a without slots 8.

Referring again to FIG. 2, since the upper elongated strip 12 sits on the lower strip 13, the upper strip extends into the mouth of the funnel slightly further than the lower strip a distance equal to the thickness of the lower strip. Furthermore, in view of the fact that the funnel diameter decreases as one progressses into the funnel, the horizontal segment of the upper strip 12 is slightly shorter than the horizontal segment of the lower strip 13. By the same token it can be seen that the downwardly extending segments of upper strip 12 are slightly longer than the downwardly extending segments of lower strip 13 so that the respective curled segments commence at the same relative height.

Figure 5:
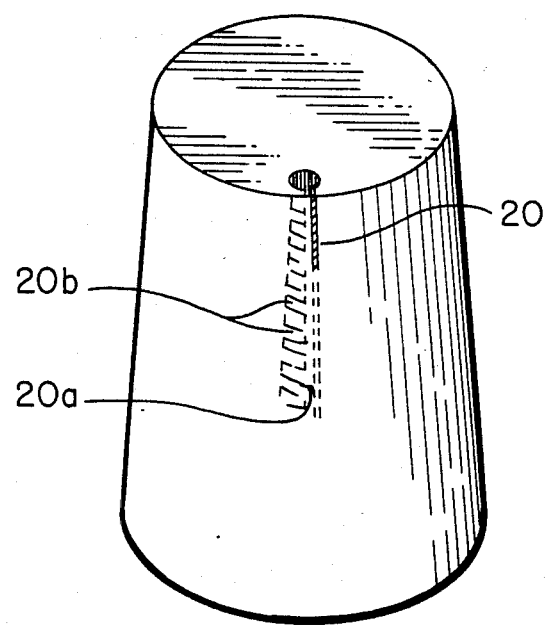
FIG. 5 is an alternative embodiment of base member 1 of FIG. 2.

An additional feature of the present invention is shown in FIG. 5, wherein numeral 20 designates an elongated spring clip which may be molded or otherwise attached to the underside of the top of base member 1 near the periphery of such top. This spring clip may be a tapered hollow cylinder having a longitudinal slit 20a and transverse ribs 20b on its inside to enable the unit to be slipped over and held by a stake or pole. Such poles ordinarily are about ¼-½ inch in diameter. In the prior art, instead of a spring clip, a slot about three inches deep was cut into the trap pole, and the wall of the base member was slipped into the slot. Thus, the tapered spring clip of the present invention eliminates the need of cutting such a slot in the support pole, and the tapered clip is able to accomodate a range of pole dimensions of about ¼-½ inch diameter.

In the operation of the present invention, boll weevils land on the base member's support pole, not shown, or on the outside of the base member, and climb the unit to enter the funnel either through annular space 4 or orifice 1a located at the periphery of the top of base member 1 (see FIG. 2). In addition to allowing weevils inside the base member to enter the funnel, orifice 1a permits a plurality of base members to be readily stacked upon one another during storage. That is, the elongated spring clip (FIG. 5) of a first base member may be inserted through orifice 1a in the next lower base member in the stack. To accomodate the spring clips, orifice 1a may be about ½ inch in diameter.

While the jacket retaining means has been shown as a plurality of strips across the top of the base member, it will be appreciated that this retaining means may be secured to the sides of the base member, and that the shape of the retainer may be something other than flat strips. In addition it will be appreciated that other known holding or clasping expedients on the jacket retaining means, rather than the illustrated curled segments, may be employed to clasp, grasp or hold the jacket and mesh. Still further it will be appreciated that mechanical expedients other than notches or channel means, such as pins projecting from the inner periphery of first ring 5a of the jacket 5, may be employed to retain the funnel on the jacket.

What is claimed is:

1. An apparatus for capturing weevils wherein an inverted wire mesh funnel, which is open at its apex and circular mouth, is mounted on a base member, the base member having an inner peripheral wall and a top, wherein an annular space is defined between the inside of said mouth and the outside of said base member to permit entry of weevils through said annular space, wherein a capture chamber is mounted on said funnel so that said apex substantially extends into said capture chamber, the improvement comprising:
   a. a first ring-shaped member releasably connected around said funnel mouth to maintain said circular configuration of said mouth;
   b. ring retaining means releasably connected to said base member and to said first ring-shaped member to hold said ring-shaped member in place upon said base member.

2. The apparatus of claim 1 wherein said ring-shaped member includes upwardly facing circumferential channel means to receive and retain said funnel therein at said mouth.

3. The apparatus of claim 1 wherein said ring retaining means includes a ring clasping member.

4. The apparatus of claim 1 further including a plurality of ribs connected to said ring-shaped member and extending upwardly therefrom to conform to the slope of the outside of said funnel, further including a second ring-shaped member connected to the upper ends of said ribs, wherein said capture chamber is releasably connected to said second ring-shaped member, wherein said first and second ring-shaped members and said ribs define a funnel jacket.

5. The apparatus of claim 1 further including elongated spring clip means projecting downwardly from the periphery of the inside of said base member's top to enable said base member to be connected to a stake.

6. The apparatus of claim 2 wherein said first ring-shaped member includes a plurality of slots spaced apart along its circumference, wherein each of said slots extends from said first member's outer periphery through said first member's body to said first member's inner periphery, wherein each of said slots includes a ledge adjacent its lower border which ledge extends inwardly and upwardly of said first member, wherein each of said ledges and its adjacent surface of said first member defines a channel, and wherein a plurality of said channels define said circumferential channel means.

7. The apparatus of claim 3 wherein said ring retaining means comprises at least two elongated strips releasably secured to one another at right angles across said base member's top.

8. The apparatus of claim 3 wherein each ring retaining means comprises at least one elongated strip which comprise:
   a. an elongated horizontal segment which is approximately as long as the diameter of said funnel's mouth, wherein said horizontal segment is releasably secured to said base member's top;
   b. a downwardly projecting segment at each end of said horizontal segment;
   c. a curled segment beyond each of said downwardly projecting segments, wherein each of said curled segments extends upwardly and then inwardly toward its adjacent downwardly projecting segment, wherein said curled segment and its adjacent downwardly projecting segment define said ring clasping member.

9. The apparatus of claim 6 wherein said ring retaining means includes a segment which extends from said first ring-shaped member's outer periphery through a slot in said first ring-shaped member to press against said funnel's wire mesh held in place in said channel adjacent said slot, wherein said ring retaining means further includes another segment to press against said first member's inner periphery adjacent said slot.

10. The apparatus of claim 6 wherein said ring retaining means comprises at least one elongated generally flat strip having a ring clasping member at each end.

11. The apparatus of claim 8 wherein there are at least two elongated strips releasably secured to one another at right angles across said base member's top.

12. The apparatus of claim 9 wherein said ring retaining means comprises at least two elongated generally flat strips having a ring clasping member at each end, wherein said strips are releasably secured to one another at right angles across said base member's top.

13. The apparatus of claim 10 wherein there are a greater number of slots than clasping members.

14. The apparatus of claim 10 wherein said elongated strip comprises:
   a. an elongated horizontal segment which is approximately as long as the diameter of said funnel's mouth, wherein said horizontal segment is releasably secured to said base member's top;
   b. a downwardly projecting segment at each end of said horizontal segment;
   c. a curled segment beyond each of said downwardly projecting segments, wherein each of said curled segments extends upwardly and then inwardly toward its adjacent downwardly projecting segment, wherein said curled segment and its adjacent downwardly projecting segment define said ring clasping member, wherein said curled segment's leading segment extends from said first ring-shaped member's outer periphery through a slot therein to press against wire mesh held in place in the channel defined adjacent said slot, wherein said downwardly projecting segment adjacent said curled segment presses against the inner periphery of said first ring-shaped member adjacent said slot.

15. The apparatus of claim 11 further including a plurality of ribs connected to said first ring-shaped member and extending upwardly therefrom to conform to the slope of the outside of said funnel, further including a second ring-shaped member connected to the upper ends of said ribs, wherein said capture chamber is releasably connected to said second ring-shaped member, wherein both ring-shaped members and said ribs define a funnel jacket.

16. The apparatus of claim 14 wherein there are more slots than curled segments.

17. The apparatus of claim 16 wherein there are at least two elongated strips releasably secured to one another at right angles across said base member's top.

18. The apparatus of claim 17 further including a plurality of ribs connected to said first ring-shaped member and extending upwardly therefrom to conform to the slope of the outside of said funnel, wherein a second ring-shaped member is connected to the upper ends of said ribs, wherein said capture chamber is releasably connected to said second ring-shaped member, wherein both ring-shaped members and said ribs define a funnel jacket.

19. The apparatus of claim 18 further including elongated spring clip means projecting dovnwardly from the periphery of the inside of said base member's top to enable said base member to be connected to a stake.

20. The apparatus of claim 19 wherein said base member's top is closed except for small orifice means to permit weavils inside said base member to enter said funnel.

* * * * *